UNITED STATES PATENT OFFICE.

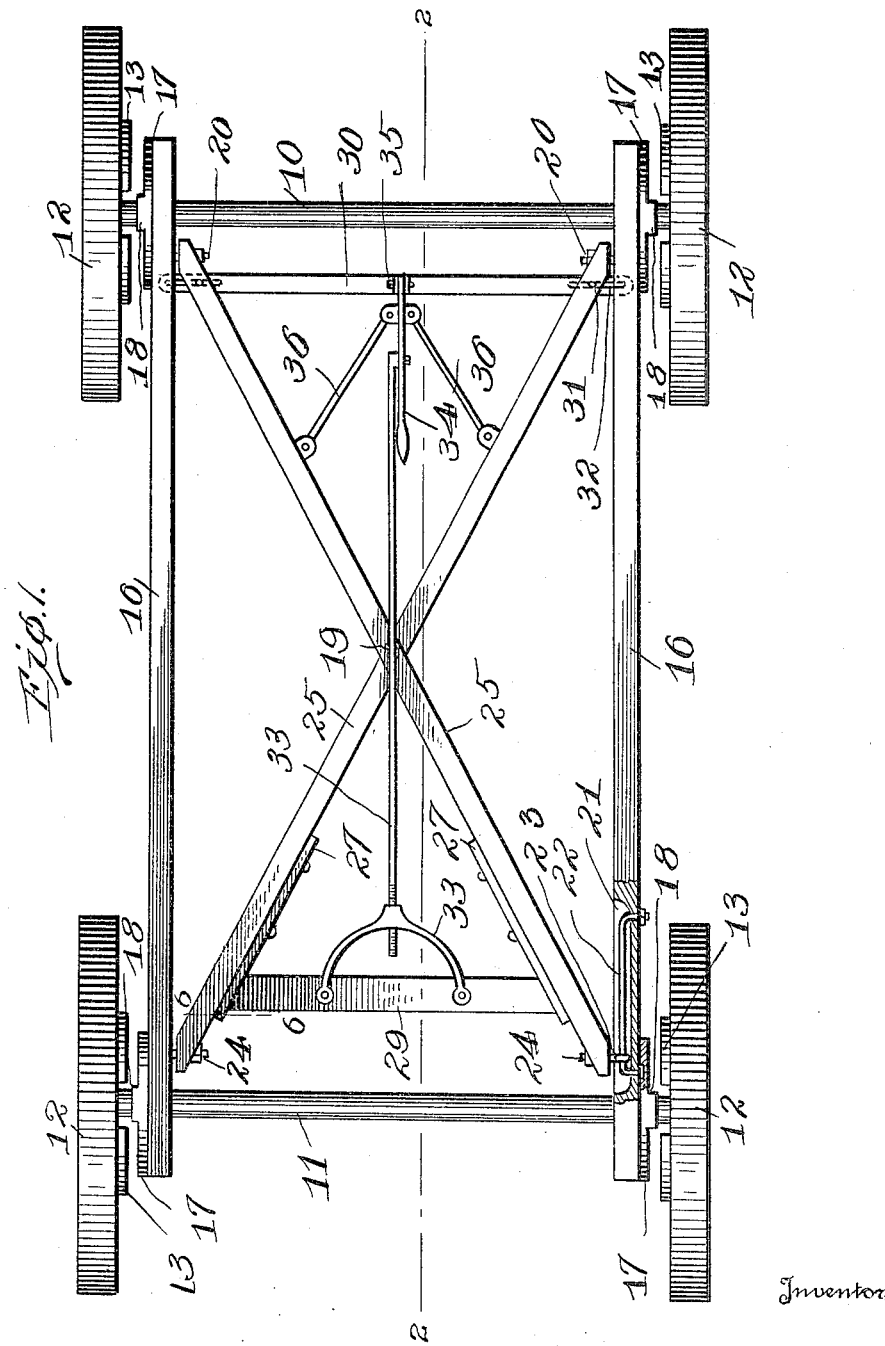

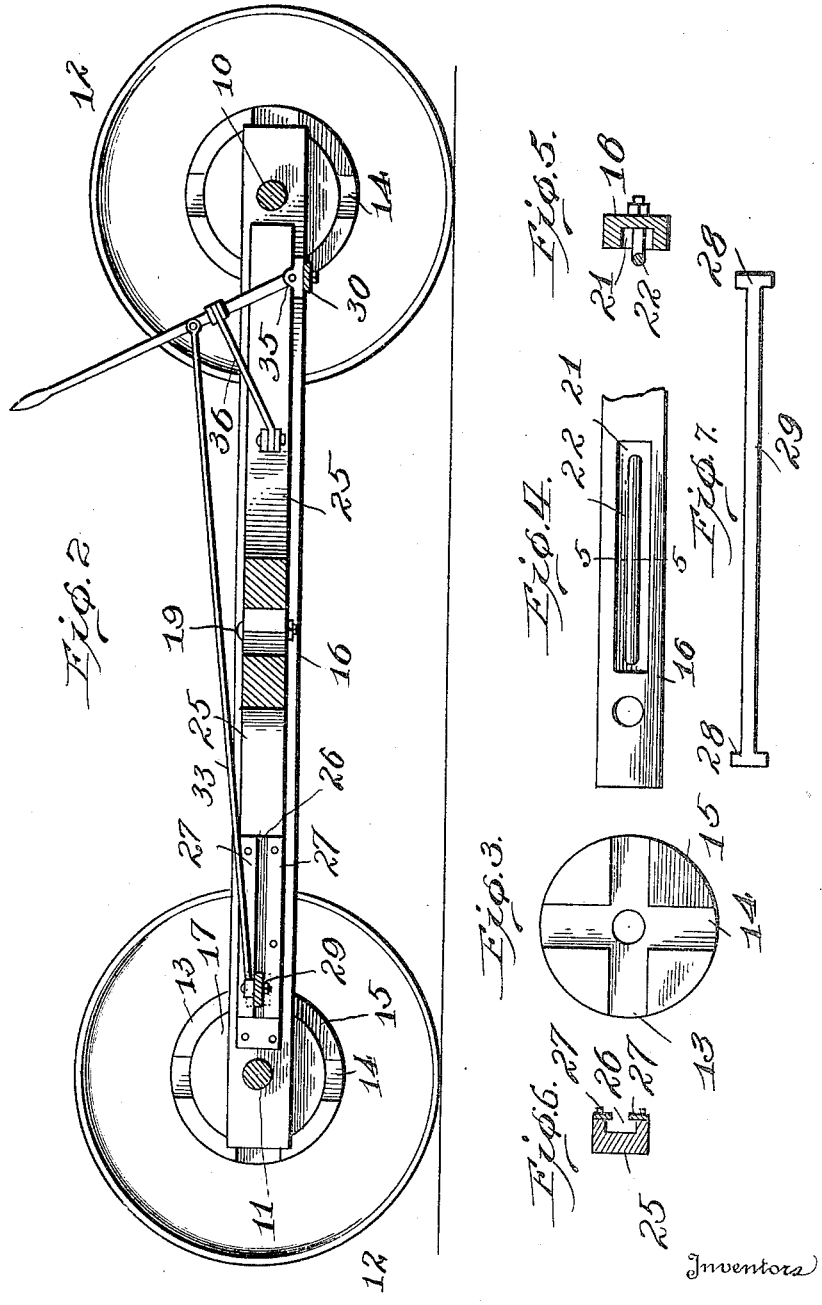

COLOMAN PAPAI AND JOHN PETRI, OF ELBERTA, ALABAMA.

VEHICLE BRAKE APPLIANCE.

1,106,834. Specification of Letters Patent. Patented Aug. 11, 1914.

Application filed March 10, 1914. Serial No. 823,692.

*To all whom it may concern:*

Be it known that we, COLOMAN PAPAI and JOHN PETRI, subjects of the King of Hungary, residing at Elberta, in the county of Baldwin and State of Alabama, have invented certain new and useful Improvements in Vehicle Brake Appliances, of which the following is a specification.

This invention relates to certain new and useful improvements in vehicle brake appliances.

The primary object of the present invention is to provide upon all kinds of vehicles and especially automobiles, a device whereby any or all of the wheels thereof may be instantly locked against rotation.

A further object of the device is to provide means for preventing accidents to vehicles when the driver loses control of the same by providing a means manually operable for rigidly locking all of the wheels of the vehicle and thus stopping its travel.

A still further object is to provide a means simple in its construction and cheap and easy to manufacture which may be applied to any vehicle and being manually operable by the driver thereof for engaging non-rotating clutch blocks with the vehicle wheels.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—Figure 1 is a plan view of the device employed upon a four-wheeled vehicle. Fig. 2 is a longitudinal sectional view thereof taken upon the line 2—2 of Fig. 1. Fig. 3 is a front elevation of one of the locking disks carried by the vehicle wheels. Fig. 4 is a side elevation of a side bracket. Fig. 5 is a vertical transverse sectional view taken upon line 5—5 of Fig. 4. Fig. 6 is a vertical transverse sectional view taken on the line 6—6 of Fig. 1, and, Fig. 7 is a front elevation of the shifting actuating bar.

Referring more in detail to the drawings, the front axle 10 and rear axle 11 of the vehicle are disclosed having the traction wheels 12 mounted thereon in the usual manner, each of said wheels being provided on its inner face with one of the locking disks 13 as shown in Fig. 3. The said disks 13 have receiving grooves 14 arranged upon the perpendicular diameters of one face of the disk and thus providing four segment blocks 15 which are positioned between the adjacent grooves. The opposite side bars 16 being slidably-mounted upon said axles are provided on their outer sides adjacent their extremities with clutching disks 17 which consist of circular members having diametrical ridges 18. It will thus be noted that the ridges of the clutching disks are adapted upon a forward sliding movement of the side bars 16 to engage within the grooves of the locking disks and by which operation it will be evident that the traction wheels of the vehicle will be instantly locked against further rotation and consequently checking the movement of the vehicle.

The actuating means for the side bars and the clutching device consists of diagonally-arranged rods 25 positioned between the side bars and pivotally-connected at their centers by the bolt 19 while the forward ends of the rods are laterally-slidable upon bolts 20 carried by the side bars. Inner sockets 21 are provided in the side bars at opposite sides and adjacent the rear ends thereof within which are longitudinally positioned the racks 23 of bolts 24, which latter are secured to the rear ends of the pivoted rods 25. The rods 25 are provided upon their inner faces adjacent the rear ends thereof with grooves 26, as best shown in Fig. 6, and having cleats 27 partially closing the grooves and adapted to retain slidably therein the enlarged ends 28 of the slide bar 29. A forward brace 30 is mounted below the side bars and parallel to the front axle 10, and is suspended from the forward ends of the rods 25 upon headed pins 31 projecting through closed end slots 32 of said brace. A yoke 33 rigidly-secured medially of the slide bar has adjustably attached thereto a rod 33 at its rear end while the forward end of said bar is pivoted to a hand lever 34 and whereby as will be evident, the swinging of said hand lever forwardly moves the slide bar also forwardly within the slots 26 of the rods 25, thereby forcing the ends of said rods outwardly against the side bars 16 and whereby such bars are outwardly shifted with their clutching disks 17 and so as to bring such disks in clutching engagement with the locking disks 15 carried by the traction wheels.

For perfectly performing this operation, it must be noted that the hand lever 34 is pivoted at its lower end to the block 35 centrally carried by the brace 30. This arrangement of lever-actuated slide bar will completely perform the operation of the clutching of the wheels. It is found advisable to connect the hand lever at a point between the block 35 and its pivotal connection with the rod 33 to the adjacent inner sides of the rods 25 by means of brace links 26 pivoted to said rods and lever.

From this detailed description of the device, it will be apparent that when the operator of the vehicle desires to suddenly stop the same or to lock all of the wheels thereof against rotation, it is only necessary to move forwardly the hand lever 34 which thereby forces forwardly the slide bar 29, which tends to force outwardly the ends of the rods 25 sliding upon their respective bolts 20 and 24. The racks 22 compensate for the difference in length between the ends of the diagonally-arranged rods when the same are expanded and contracted, while the pin and slot engagement of the brace 30 with the forward ends of the rods allows for a free movement thereof. Such movement as heretofore indicated of the ends of the rods 25 forcing outwardly the side bars 16 obviously engages the clutching disks of said bars with the locking disks of each of the wheels and thereby preventing further rotation of the latter.

While we have herein shown and described the preferred embodiment of our invention, we do not wish to limit ourselves thereto, as various forms and modifications may be had which will fall within the spirit and scope of the invention.

Having thus fully described our invention, what is claimed as new and desired to secure by Letters Patent is:—

1. A device of the class described comprising vehicle axles, ground wheels at the ends of said axles, locking disks carried by the inner faces of said wheels, side bars slidably-mounted upon said axles between said wheels, clutching disks carried by said bars concentric with said axles, diagonally-arranged rods having their ends slidably-mounted adjacent the ends of said bars, a slide bar carried between the rear portions of said rods, and means for shifting said slide bar for engaging said locking disks with said clutching disks.

2. A device of the class described comprising vehicle axles, ground wheels at the ends of said axles, locking disks carried by the inner faces of said wheels, side bars slidably-mounted upon said axles between said wheels, clutching disks carried by said bars concentric with said axles, bolts carried by the forward ends of said bars, racks carried by the rear ends of said bars, diagonally-arranged rods positioned between said bars and having their forward ends laterally movable upon said bolts and their rear ends longitudinally slidable upon said racks, and means adapted for separating the adjacent ends of said rods for interengaging said locking disk and clutching disk.

3. A device of the class described comprising vehicle axles, ground wheels at the ends of said axles, locking disks carried by the inner faces of said wheels, side bars slidably-mounted upon said axles between said wheels, clutching disks carried by said bars concentric with said axles, bolts carried by the forward ends of said bars, racks carried by the rear ends of said bars, diagonally-arranged rods positioned between said bars and having their forward ends laterally movable upon said bolts and their rear ends longitudinally slidable upon said racks, the rear ends of said rods having longitudinal slots therein, a slide bar movably engaging within said slots, a brace slidably pinned beneath the forward ends of said rods, an actuating lever pivoted to said brace, pivoted links between said lever and the adjacent portions of said rods, and an adjustable link pivoted to said lever and secured to said slide bar, substantially as described.

In testimony whereof we affix our signatures in presence of two witnesses.

COLOMAN PAPAI.
JOHN PETRI.

Witnesses:
HERMANN SCHROEDER,
EDGAR KOEHLER.

---

Copies of this patent may be obtained for five cents each, by addressing the "Commissioner of Patents Washington, D. C."